United States Patent
Bovina et al.

(10) Patent No.: US 7,941,996 B2
(45) Date of Patent: May 17, 2011

(54) ACTUATION SYSTEM FOR A SERVO-ASSISTED MECHANICAL TRANSMISSION WITH OIL LEAKAGE RECOVERY

(75) Inventors: Luca Bovina, Casalecchio Di Reno (IT); Giuseppe Medico, Rivoli (IT)

(73) Assignee: Magneti Marelli Powertrain, S.p.A., Corbetta (IT)

( * ) Notice: Subject to any disclaimer, the term of this patent is extended or adjusted under 35 U.S.C. 154(b) by 362 days.

(21) Appl. No.: 12/156,779

(22) Filed: Jun. 4, 2008

(65) Prior Publication Data
US 2009/0019845 A1 Jan. 22, 2009

(30) Foreign Application Priority Data
Jun. 4, 2007 (EP) .................................. 07425346

(51) Int. Cl.
*F16D 31/02* (2006.01)
*F01B 31/00* (2006.01)
(52) U.S. Cl. .............................................. 60/378; 92/86
(58) Field of Classification Search ................ 60/378, 60/455; 92/86
See application file for complete search history.

(56) References Cited

U.S. PATENT DOCUMENTS

| 3,832,935 | A | * | 9/1974 | Syassen | 92/86 |
| 5,036,933 | A | * | 8/1991 | Heinrich | 92/86 |
| 5,469,704 | A | * | 11/1995 | Kramer | 60/455 |
| 6,739,999 | B2 | * | 5/2004 | Medico | 475/136 |

FOREIGN PATENT DOCUMENTS

| DE | 4133188 | 4/1992 |
| DE | 4433106 | 3/1995 |
| EP | 19849488 | 5/2000 |
| WO | WO 2005/106296 | 11/2005 |

* cited by examiner

*Primary Examiner* — Michael Leslie
(74) *Attorney, Agent, or Firm* — Ohlandt, Greeley, Ruggiero & Perle, L.L.P.

(57) ABSTRACT

An actuation system for a servo-assisted transmission; the actuation system is provided with: a hydraulic circuit comprising a reservoir containing a control fluid, a hydraulic accumulator containing the pressurized control fluid, and a pump which draws from the reservoir and feeds the hydraulic accumulator; at least a hydraulic actuator comprising at least one actuation chamber and a mobile piston which slides within the actuation chamber; a solenoid valve for connecting the actuation chamber of the hydraulic actuator to the hydraulic accumulator and to the reservoir; and a recirculation circuit, which departs from at least one environment bordering with the actuation chamber of the hydraulic actuator and ends in the reservoir.

10 Claims, 2 Drawing Sheets

ACTUATION SYSTEM FOR A SERVO-ASSISTED MECHANICAL TRANSMISSION WITH OIL LEAKAGE RECOVERY

TECHNICAL FIELD

The present invention relates to an actuation system for a servo-assisted mechanical transmission.

BACKGROUND ART

Servo-assisted mechanical transmissions, which are structurally similar to mechanical manual transmission of the traditional type except for the fact that the clutch pedal and the gear selection lever operated by the driver are replaced by corresponding electrical or hydraulic servo-controls, are increasingly widespread. By using a servo-assisted mechanical transmission, the driver only needs to send the order to shift gear up or down to a transmission control unit and the transmission control unit autonomously shifts gear by operating both on the engine and on the servo-controls associated to clutch and gearbox.

The gear shifting order may be generated either manually, i.e. following a command imparted by the driver, or automatically, i.e. regardless of the driver's action. When the gear shifting order is generated, the transmission control unit drives the servo-control of the clutch to open the clutch so as to mechanically separate a primary shaft of the gearbox from a crankshaft; at the same time, the transmission control unit acts on the engine control unit to temporarily reduce the motive torque supplied by the engine itself.

Once the transmission control unit has verified the opening of the clutch, the transmission control unit drives the gearbox servo-control to disengage the currently engaged gear; when the transmission control unit has verified the gear disengagement, the transmission control unit drives the gearbox servo-control to displace the gearbox control shaft so as to arrange the engagement of the new gear. Once the transmission control unit has verified that the gearbox control shaft has reached the required position, the transmission control unit drives the gearbox servo-control to engage the new gear.

Finally, when the transmission control unit has verified that the new gear has been engaged, the transmission control unit drives the clutch servo-control to close the clutch and make the primary shaft of the gearbox and the crankshaft reciprocally and angularly integral; at the same time, the transmission control unit acts on the engine control unit to restore the motive torque supplied by the engine itself.

The clutch servo-control is generally of the hydraulic type and comprises a single hydraulic actuator for displacing the clutch from the closed position to the open position and vice versa. Generally, the gearbox servo-control is also of the hydraulic type and acts on a gearbox control shaft to impress on the control shaft itself both an axial displacement, i.e. along a central axis, to select the gear range, and a rotation about the central axis to engage and disengage each gear. Consequently, the gearbox servo-control comprises a first hydraulic actuator mechanically coupled to the control shaft to axially displace the control shaft and a second hydraulic actuator mechanically coupled to the control shaft to turn the control shaft.

Each hydraulic actuator comprises at least one actuation chamber delimited on one side by a mobile piston, which slides along the actuation chamber itself and is connected to a control shaft; the actuation chamber is filled with a pressurized fluid to displace the piston along the actuation chamber itself. Solutions have been suggested in which each hydraulic actuator comprises two chambers which are alternatively filled with pressurized fluid to move the piston in the two directions, and solutions have also been suggested in which each hydraulic actuator comprises a single actuation chamber which is filled with the pressurized fluid to displace the piston in a single direction and against the elastic bias generated by a spring which provides for displacing the piston in the opposite direction.

The actuation chamber of a hydraulic actuator normally presents a cylindrical tubular shape and is delimited on one side by the piston and on the opposite side by a plug; the plug is provided with at least one static annular seal and the piston is provided with at least one sliding annular seal. Leakages of the pressurized fluid which is fed to the actuation chamber are always possible through such seals; these leakages are undesired, because they reduce the amount of fluid present in the hydraulic system (thus after a certain time the fluid level in the hydraulic system needs topping up) and may soil both the hydraulic actuator and the components arranged underneath the hydraulic actuator (the leaked fluid tends to move downwards by gravity).

DISCLOSURE OF INVENTION

It is the object of the present invention to provide an actuation system for a servo-assisted mechanical transmission, which actuation system is free from the above-described drawbacks, and is specifically easy and cost-effective to manufacture and very compact.

According to the present invention, an actuation system for a servo-assisted mechanical transmission is provided as claimed in the attached claims.

BRIEF DESCRIPTION OF THE DRAWINGS

The present invention will now be described with reference to the accompanying drawings which illustrate a non-limitative example of embodiment thereof, in which.

PREFERRED EMBODIMENTS OF THE INVENTION

Figure 1:
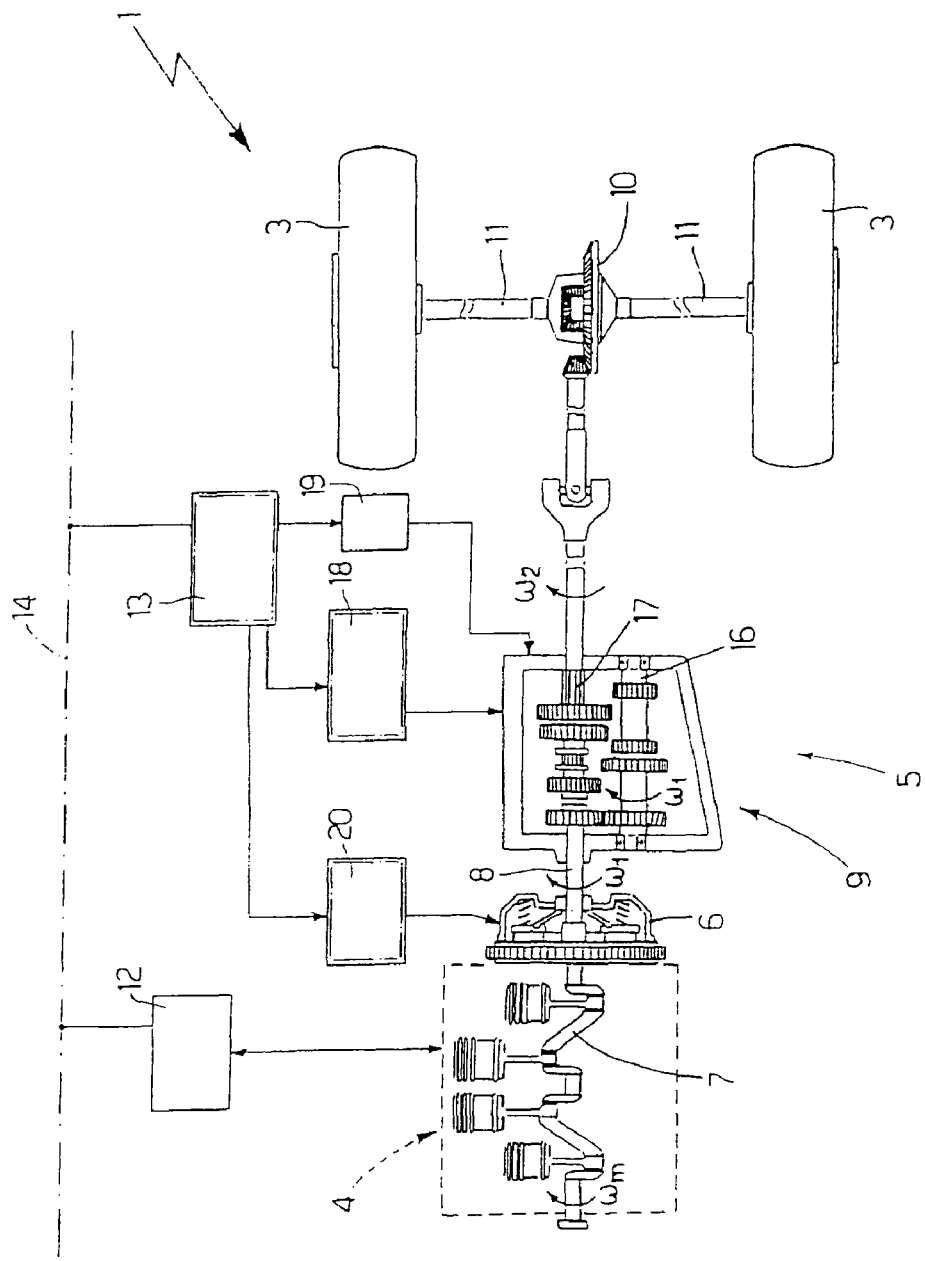
FIG. 1 is a diagrammatic view of a vehicle provided with a servo-assisted mechanical transmission.

In FIG. 1, numeral 1 indicates as a whole a car provided with two front wheel and two rear drive wheels 3 which receive the motive torque generated by an internal combustion engine 4 by means of a servo-assisted transmission 5. Servo-assisted transmission 5 comprises a servo-assisted clutch 6, which is connected to a bell integral with engine 4 and adapted to connect crankshaft 7 of engine 4 to a propeller shaft 8 ending in a servo-assisted gearbox 9 arranged at the rear axle. A self-locking differential 10, from which differential a pair of drive axles 11 depart, each of which integral with a corresponding rear drive wheel 3, is arranged in cascade to servo-assisted gearbox 9.

Car 1 comprises an engine control unit 12 (diagrammatically shown), a transmission control unit 13 (diagrammatically shown), and a BUS line 14, which implements CAN (Car Area Network) protocol and spans throughout entire car 1. Both engine control unit 12 and transmission control unit 13 are connected to BUS line 14 and may therefore reciprocally communicate by means of messages forwarded on BUS line 14 BUS itself.

Servo-assisted gearbox 9 comprises a primary shaft 16, which turns at an angular velocity $\omega_1$, and a secondary shaft 17, which turns at an angular velocity $\omega_2$ and transmits motion to rear drive wheels 3 by means of differential 10 and drive axle pair 11. Servo-assisted gearbox 9 is operated by a hydraulic actuator 18 for engaging/disengaging a gear and a hydraulic actuator 19 for selecting the gear range; hydraulic actuators 18 and 19 are controlled by servo-assisted transmission control unit 13.

By interposition of servo-assisted clutch 6, primary shaft 16 is connected to crankshaft 7, which is revolved by engine 4 and turns at an angular velocity $\omega_m$. Servo-assisted clutch 6 is operated by a hydraulic actuator 20 driven by control unit 13 of servo-assisted clutch 5.

Figure 2:
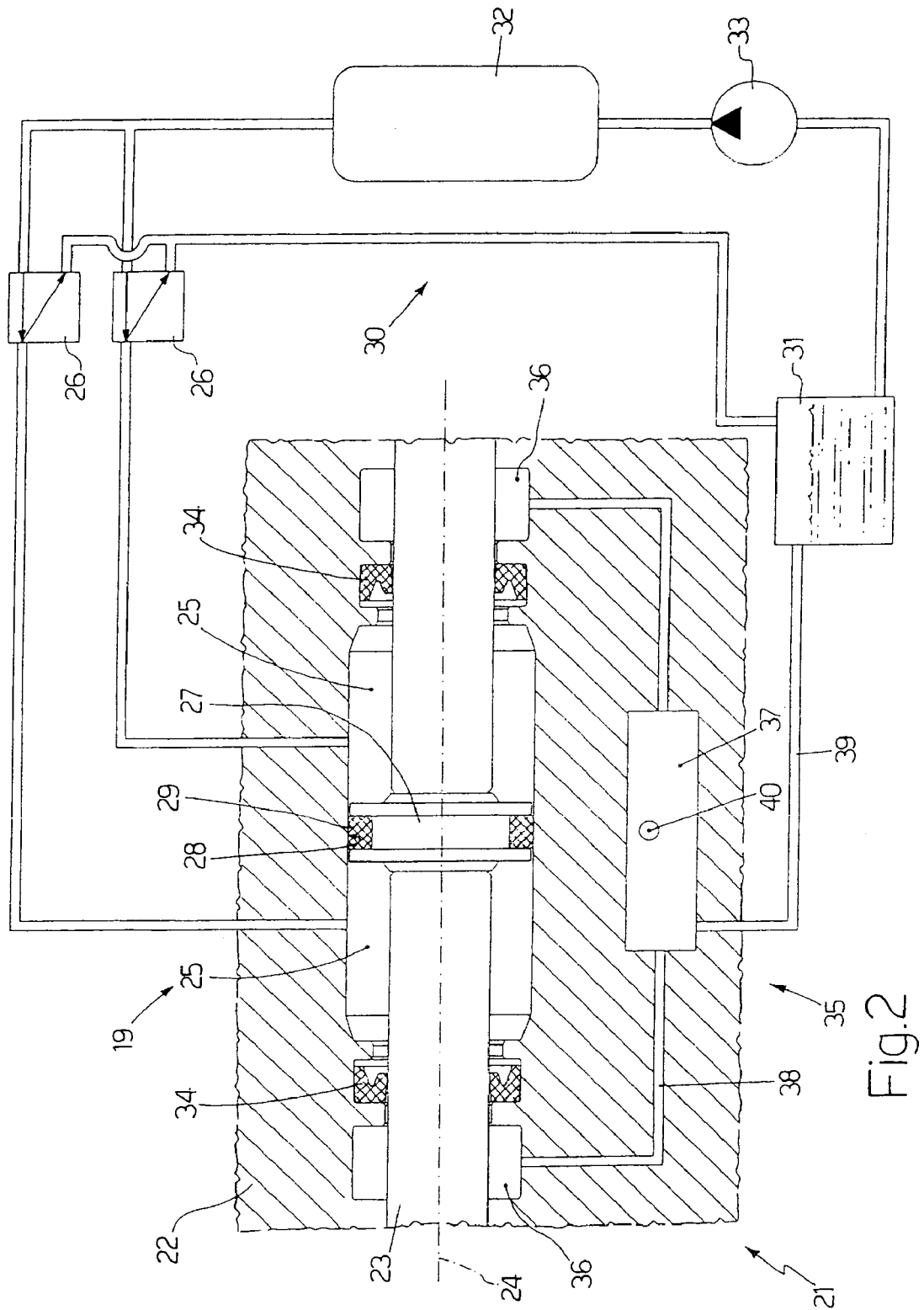
FIG. 2 is a diagrammatic section view with parts removed for clarity of an actuation system of the servo-assisted mechanical transmission in FIG. 1 made according to the present invention.

Hydraulic actuators 18, 19 and 20 constitute part of an actuation system 21 of servo-assisted transmission 5, partially shown in FIG. 2. As shown in FIG. 2, actuation system 21 comprises a supporting body 22 (partially shown in FIG. 2) in which three hydraulic actuators 18, 19 and 20 are inserted. Specifically, FIG. 2 shows hydraulic actuator 19 adapted to select the gear range by impressing an axial displacement, i.e. along a central axis 24, to a control shaft 23; hydraulic actuator 18 (not shown) impresses a rotation about central axis 24 to engage and disengage each gear on control shaft 23.

As shown in FIG. 2, hydraulic actuator 19 is arranged at an intermediate portion of control shaft 23 and presents two actuation chambers 25, which are obtained in supporting body 22 and are alternatively filled with pressurized oil (which constitutes a control fluid of actuation system 21) so as to axially displace control shaft 2 in the two directions under the control of a pair of three-way solenoid valves 26. Specifically, the two actuation chambers 25 are crossed by control shaft 2, are arranged in series along control shaft 2, and reciprocally separated by a flange 27, which is integral with control shaft 23 and defines a piston of linear hydraulic actuator 19, which piston is slidingly mobile within actuation chamber 25. Flange 27 comprises a central annular cavity 28 which accommodates an annular seal 29.

Actuation system 21 further comprises a hydraulic circuit 30 comprising a reservoir 31 containing the oil, a hydraulic accumulator 32 containing the pressurized oil, and a pump 34 which draws from reservoir 31 and feeds the hydraulic accumulator. Each three-way solenoid valve 26 is capable of maintaining corresponding actuation chamber 25 isolated to maintain the oil pressure in actuation chamber 25 constant, is capable of connecting actuation chamber 25 to reservoir 31 for reducing pressure P of the oil in actuation chamber 25, and is adapted to connect actuation chamber 25 to hydraulic accumulator 32 to increase the pressure of the oil in actuation chamber 25.

Each actuation chamber 25 is sealed on one side by seal 29 of flange 27 and on the other side by an annular lip seal 34 through which control shaft 23 slides. A possible leakage of oil through seal 29 of flange 27 is not significant, because the oil leakage through seal 29 of flange 27 is collected by the other actuation chamber 25 and thus maintained inside hydraulic circuit 30. Instead, a possible leakage of oil through a seal 34 could cause problems, because the oil leakage through a seal 34 leaves hydraulic circuit 30 and thus reduces the quantity of oil present in hydraulic circuit 30 and could soil both parts of actuation system 21 and parts of servo-assisted transmission 5. In order to collect and recirculate the oil which leaks through seals 34 in circuit 30, a recirculation circuit 35 is provided which ends with reservoir 31 and departs from two collection chambers 36, each of which borders with an actuation chamber 25, is arranged by the side of actuation chamber 25, and is isolated from actuation chamber 25 itself by a seal 34.

Furthermore, recirculation circuit 35 comprises a collection chamber 37, which is arranged lower than actuation chamber 25 and lower than collection chambers 36, and is hydraulically connected to collection chambers 36 and to reservoir 31. Specifically, recirculation circuit 35 comprises a feeding tube 38, which departs through a lower wall of collection chamber 37 and ends in reservoir 31, and two feeding tubes 39, each of which departs through a lower wall of collection chamber 36 and ends in collection chamber 37.

According to a preferred embodiment, collection chamber 37 comprises at least one through hole 40 for connecting collection chamber 37 itself to the external environment; instead, hydraulic circuit reservoir 31 is sealed and isolated from the external environment so as to generate a vacuum therein when pump 33 aspirates oil from reservoir 31 itself. In this manner, whenever pump 33 aspirates oil from reservoir 31, a vacuum which aspirates oil possibly present in the bottom of collection chamber 37 is generated inside reservoir 31.

During operation of actuation system 21, the oil which may leak out of actuation chambers 25 (i.e. out of hydraulic circuit 30) through seals 34 is deposited by gravity on the bottom of collection chambers 36 and from here descends by gravity along feeding tube 38 towards collection chamber 37 depositing by gravity on the bottom of collection chamber 37. When pump 32 aspirates oil from reservoir 31, a vacuum is generated within reservoir 31 which aspirates the oil possibly present on the bottom of collection chamber 37 returning the oil previously leaked from hydraulic circuit 30 to hydraulic circuit 30 itself.

FIG. 2 shows only the part of recirculation circuit 35 related to hydraulic actuator 19; according to a preferred embodiment, recirculation circuit 35 comprises further components (further collection chambers and further feeding tubes) coupled to hydraulic actuators 18 and 20 entirely similar to the previously described components (collection chambers 36 and feeding tubes 38) coupled to hydraulic actuator 19. Preferably, recirculation circuit 35 comprises a single collection chamber 37 in common to the three hydraulic actuators 18, 19 and 20.

The above-described actuation system 21 presents a number of advantages because it is simple, cost-effective and compact and above all allows to effectively and efficiently recover the oil which leaks out from hydraulic circuit 30 through seals 34 which seal actuation chambers 25.

The invention claimed is:

1. An actuation system for a servo-assisted transmission; the actuation system comprises:
   a hydraulic circuit comprising a reservoir containing a control fluid, a hydraulic accumulator containing the control fluid that is pressurized, and a pump which draws from the reservoir and feeds the hydraulic accumulator;
   at least a hydraulic actuator comprising at least one actuation chamber and a mobile piston which slides within the actuation chamber;
   a solenoid valve for connecting the actuation chamber of the hydraulic actuator to the hydraulic accumulator and to the reservoir; and
   a recirculation circuit, which departs from at least one environment bordering with the actuation chamber of the hydraulic actuator and ends in the reservoir, wherein the recirculation circuit comprises a first collection chamber, which is arranged lower than the actuation chamber of the hydraulic actuator and is hydraulically connected to the reservoir, and wherein the first collection chamber comprises at least one through hole for connecting the first collection chamber to the external environment, and wherein the reservoir is sealed and isolated from the external environment so as to generate a vacuum therein when the pump aspirates some fluid from the reservoir.

2. An actuation system according to claim 1, wherein the recirculation circuit comprises a first feeding tube, which departs through a lower wall of the first collection chamber and ends in the reservoir.

3. An actuation system according to claim 1, wherein the recirculation circuit comprises at least one second collection chamber, which is arranged by a side of the actuation chamber, is isolated from the actuation chamber by at least one seal, and is hydraulically connected to the first collection chamber.

4. An actuation system according to claim 3, wherein the second collection chamber is arranged higher up than the first collection chamber.

5. An actuation system according to claim 4, wherein the recirculation circuit comprises a second feeding tube, which departs through a lower wall of the second collection chamber and ends in the first collection chamber.

6. An actuation system according to claim 1 further comprising:
   a first hydraulic actuator for driving a servo-controlled clutch;
   a second hydraulic actuator for driving the range selection of the gears in a servo-assisted gearbox; and
   a third hydraulic actuator for driving the engagement/disengagement of the gears in the servo-assisted gearbox.

7. An actuation system according to claim 6, wherein the recirculation circuit comprises the first collection chamber common to the three hydraulic actuators.

8. An actuation system for a servo-assisted transmission; the actuation system comprises:
   a hydraulic circuit comprising a reservoir containing a control fluid, a hydraulic accumulator containing the control fluid that is pressurized, and a pump which draws from the reservoir and feeds the hydraulic accumulator;
   at least a hydraulic actuator comprising at least one actuation chamber and a mobile piston which slides within the actuation chamber;
   a solenoid valve for connecting the actuation chamber of the hydraulic actuator to the hydraulic accumulator and to the reservoir; and
   a recirculation circuit, which departs from at least one environment bordering with the actuation chamber of the hydraulic actuator and ends in the reservoir, wherein the recirculation circuit comprises a first collection chamber, which is arranged lower than the actuation chamber of the hydraulic actuator and is hydraulically connected to the reservoir, and at least one second collection chamber, which is arranged by a side of the actuation chamber, is isolated from the actuation chamber by at least one seal, and is hydraulically connected to the first collection chamber.

9. An actuation system according to claim 8, wherein the second collection chamber is arranged higher up than the first collection chamber.

10. An actuation system according to claim 8, wherein the recirculation circuit comprises a feeding tube, which departs through a lower wall of the second collection chamber and ends in the first collection chamber.

\* \* \* \* \*